United States Patent [19]
Isomura

[11] 3,827,419
[45] Aug. 6, 1974

[54] FUEL INJECTION MEANS FOR A DIESEL ENGINE

[75] Inventor: Takuji Isomura, Toyota, Japan

[73] Assignee: Nippondenso Co., Ltd., Kariya-shi, Aichi-ken, Japan

[22] Filed: Aug. 13, 1971

[21] Appl. No.: 171,597

Related U.S. Application Data

[63] Continuation-in-part of Ser. No. 889,066, Dec. 30, 1969.

[52] U.S. Cl. ....... 123/32.6, 123/139 ST, 123/179 L
[51] Int. Cl. ..................... F02b 3/00, F02m 39/00
[58] Field of Search ............ 123/32.6, 32.61, 179 L, 123/139 ST

[56] References Cited
UNITED STATES PATENTS

| | | | |
|---|---|---|---|
| 2,250,877 | 7/1941 | Pischinger | 123/32.6 |
| 2,502,989 | 4/1950 | Rathburn | 123/32.6 |
| 2,713,310 | 7/1955 | Muraszen | 123/32.6 |
| 2,871,796 | 2/1959 | Preisn | 123/32.6 |
| 2,960,079 | 11/1960 | Monnot | 123/32.6 |
| 3,690,768 | 9/1972 | Nagasawa | 123/32.61 |
| 3,698,373 | 10/1972 | Nagasawa | 123/32.61 |

FOREIGN PATENTS OR APPLICATIONS

| | | | |
|---|---|---|---|
| 960,760 | 4/1950 | France | 123/32.61 |
| 514,011 | 10/1959 | Great Britain | 123/32.61 |
| 532,094 | 1/1941 | Great Britain | 123/32.61 |
| 688,003 | 2/1953 | Great Britain | 123/32.61 |
| 607,230 | 12/1934 | Germany | 123/32.61 |

OTHER PUBLICATIONS

"Effects of Multiple Introduction of Fuel" SAE No. 929 A, Gupta, Myers 10/64 pp. 287, 288.

*Primary Examiner*—Laurence M. Goodridge
*Assistant Examiner*—Ronald B. Cox
*Attorney, Agent, or Firm*—Cushman, Darby & Cushman

[57] ABSTRACT

Fuel injection means for a diesel engine in which a portion of fuel is auxiliarily injected prior to main fuel injection during engine starting. A cam for driving a plunger of a fuel injection pump has a two stage lift, the first stage of the lift being for the main fuel injection and the second stage being for the auxiliary fuel injection. After the end of the first stage, the height of the top dead center of the first stage is maintained constant for a predetermined angle of rotation of the cam, and thereafter the second stage comes into operation. A pump plunger is provided with a slanted groove for terminating fuel injection, the groove being so arranged that, during normal operation of the engine, it comes to open to a fuel intake and out put port formed in a pump cylinder at the first stage of the cam lift, and during engine starting it does not open to said furl intake and out put port until the second stage is reached.

6 Claims, 6 Drawing Figures

INVENTOR
TAKUJI ISOMURA

BY Cushman, Darby & Cushman
ATTORNEYS

FUEL INJECTION MEANS FOR A DIESEL ENGINE

CROSS REFERENCE TO THE RELATED APPLICATION

This application is continuation-In-Part of the U.S. Ser. No. 889066 filed on Dec. 30, 1969.

BACKGROUND OF THE INVENTION

1. Field of the Invention

The present invention relates to fuel injection means for a diesel engine in which a portion of fuel is auxiliarily injected, during engine starting, prior to main fuel injection so as to improve the starting property of the engine by improving the combustibility of the fuel.

2. Description of the Prior Art

Hithertofore, it has been known that, by auxiliarily injecting a portion of fuel into the cylinder of a diesel engine at the suction stroke or the beginning part of the compression stroke so that the auxiliary fuel is thoroughly mixed with intake air through the aid of heat within the cylinder prior to the end of the compression stroke where the main fuel injection is performed, a highly combustible atmosphere is formed by the mixture of fuel and air, and the combustion delay of the succeedingly injected main fuel can be decreased, with the result that a very smooth and rapid combustion can be obtained and the performance of the engine can be highly increased.

In order to achieve the above operation, as a means for adding a portion of fuel prior to main fuel into the intake air, there has been proposed to provide a fuel injection pump having a cam provided with a projection or a stepped portion for auxiliary fuel injection. However, in this known means, the stroke of the plunger and thus the amount of auxiliarily injected fuel is determined by said projection or the stepped portion to a predetermined value. If the amount of auxiliarily injected fuel is adjusted to a value which is required at the engine start by using a well known cam configuration mentioned above, excessive amount of fuel will be forced to be injected during idling operation.

SUMMARY OF THE INVENTION

The present invention is aimed to eliminate the above mentioned disadvantage and has an object to improve the starting property of an engine by effecting auxiliary fuel injection only during engine starting by providing a special cam for driving a fuel injection pump, said cam having two stage lift including a first stage for the main fuel injection and a second stage for the auxiliary fuel injection after the end of the first stage, the height of the top dead center of the first stage being maintained constant for a predetermined angle of rotation of said cam until the second stage comes into operation, the arrangement being such that, during engine starting, the main fuel injection is performed at the first stage of the cam lift, then during the top dead center maintained for said predetermined angle of rotation of the cam fuel injection is temporarily stopped and thereafter during said second stage of the cam lift, a portion of fuel which is the auxiliary fuel injection for the next combustion stroke is additionally injected, and during normal engine operation, fuel injection is performed only at the first stage of cam lift and the fuel is not injected at the second stage by communicating a slanted groove in the pump plunger to a fuel intake and output port in the pump cylinder.

BRIEF DESCRIPTION OF THE DRAWING

The present invention will now be described with reference to a preferred embodiment shown in the accompanying drawings in which.

DESCRIPTION OF THE PREFERRED EMBODIMENT

Figure 1:
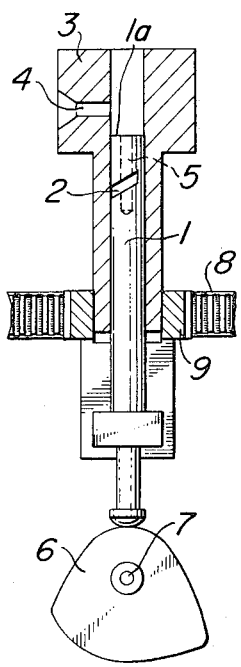
FIG. 1 is a sectional view of a pump element used in a fuel injection pump whose plunger is rotated by a control rack and is driven by a cam made in accordance with the present invention.

Referring to FIG. 1, the reference numeral (1) shows a pump plunger and (2) a slanted groove provided in the pump plunger (1) for terminating fuel injection. The reference numeral (3) shows a pump cylinder and (4) a fuel intake and output port for passing fuel into and out of the pump cylinder (3). The slanted groove (2) communicates, through a longitudinal bore (5) formed in the pump plunger between the end (1a) of the pump plunger (1) and the slanted groove (2), with a fuel conduit leading from said pump plunger to a fuel injection valve (not shown).

The reference numeral (6) shows a cam attached to a cam shaft (7) driven by an engine. The cam serves to produce a reciprocating movement of the plunger (1). The reference numeral (8) shows a control rack which serves to rotate the plunger through a pinion (9) relatively to the pump cylinder (3).

Figure 2:
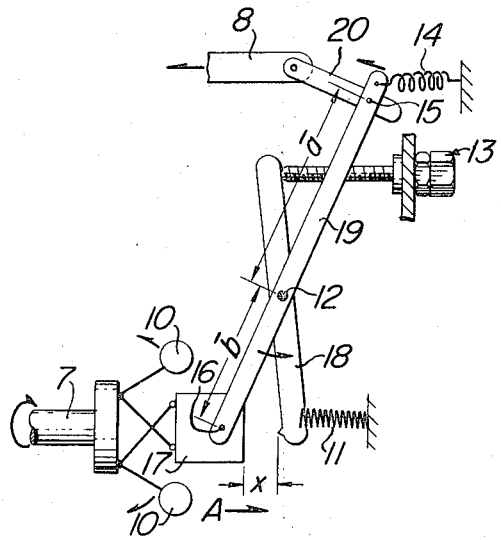
FIG. 2 is a schematic view of a mechanical governor for moving the control rack shown in FIG. 1.

Refering to FIG. 2, the reference numeral (10) shows a pair of flyweights for the mechanical governor, (11) a main spring compressed with a preset load, (12) a stationary fulcrum, (13) a stopper, (14) a start spring extended with a preset tensile load, (15) a movable fulcrum, (16) another movable fulcrum, (17) a sleeve, (18) a tension lever, (19) a control lever, and (20) a shackle.

Figure 3:
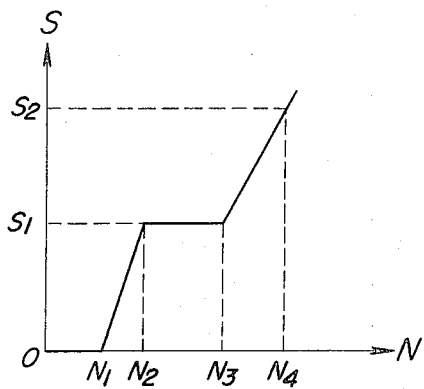
FIG. 3 is a diagram showing a characteristics of displacing distance (S) of the control rack in relation with engine speed (N), which caused by the mechanical governor as shown in FIG. 2.

When the engine is started, the cam shaft (7) is rotated so that a centrifugal force is induced in the flyweights (10) in such a direction that the sleeve (17) is forced in the direction of arrow (A). The sleeve (17) remains stationary until the thrust force in the direction of the arrow (A) overcomes the preset load in the spring (14). Referring to FIG. 3, when the engine speed becomes ($N_1$), the sleeve (17) starts to move and the movement is continued against the tension of the spring

(14) until the engine speed becomes ($N_2$) where the sleeve (17) abuts the tension lever (18).

The movement of the sleeve (17) is transmitted through the control lever (19) and shackle (20) to the control rack (8). The distance of movement of the control rack (8) is represented by the following equation:

Distance of Rack Movement = Distance of Sleeve Movement $x \; \overline{(a/b)}$ where:
$\overline{a}$ represents the distance between the movable fulcrum (15) of the control lever and the stationary fulcrum (12), and $\overline{b}$ represents the distance between the movable fulcrum (16) of the control lever and the stationary fulcrum (12).

Therefore, if the sleeve is moved by the distance (X) before it abuts the tension lever (18), the corresponding distance ($S_1$) of the movement of the control rack is represented by the equation $S_1 = X \times \overline{a/b}$.

During a normal operation of the engine, even when the engine speed is increased, the control rack is not displaced unless both of the preset load in the main spring (11) and tension load of the spring (14) are overcome by the thrust force on the sleeve. When the engine speed reaches ($N_3$) shown in FIG. 3, the control rack starts to move against the forces of the springs (11) and (14) and the movement terminates when the engine speed ($N_4$) is attained. The maximum displacement attained at this moment is shown by ($S_2$) in FIG. 3.

It is possible to clearly distinguish the difference between the control rack displacement during engine starting and that during normal engine operation, since the engine speed is never reduced below ($N_2$) during the latter operation. Further, in the aforementioned governor arrangement, it is possible to interconnect the main spring to the accelerator pedal of a vehicle so as to vary the values ($N_3$) and ($S_2$). It should be noted that in the aforementioned governor arrangement the displacement of the control rack can be converted into rotation of the plunger.

Thus, the control rack is maintained stationary during engine starting, while it is displaced by the distance ($S_1$) when the engine comes into a normal operation. Therefore, during the normal engine operation, the displacement of the control rack effectively rotates the plunger. The relationship between the fuel intake and output port (4) and the slanted groove (2) in the plunger during the engine starting and that during the normal engine operation are respectively shown by (I) and (II) in FIG. 5.

Figure 4:
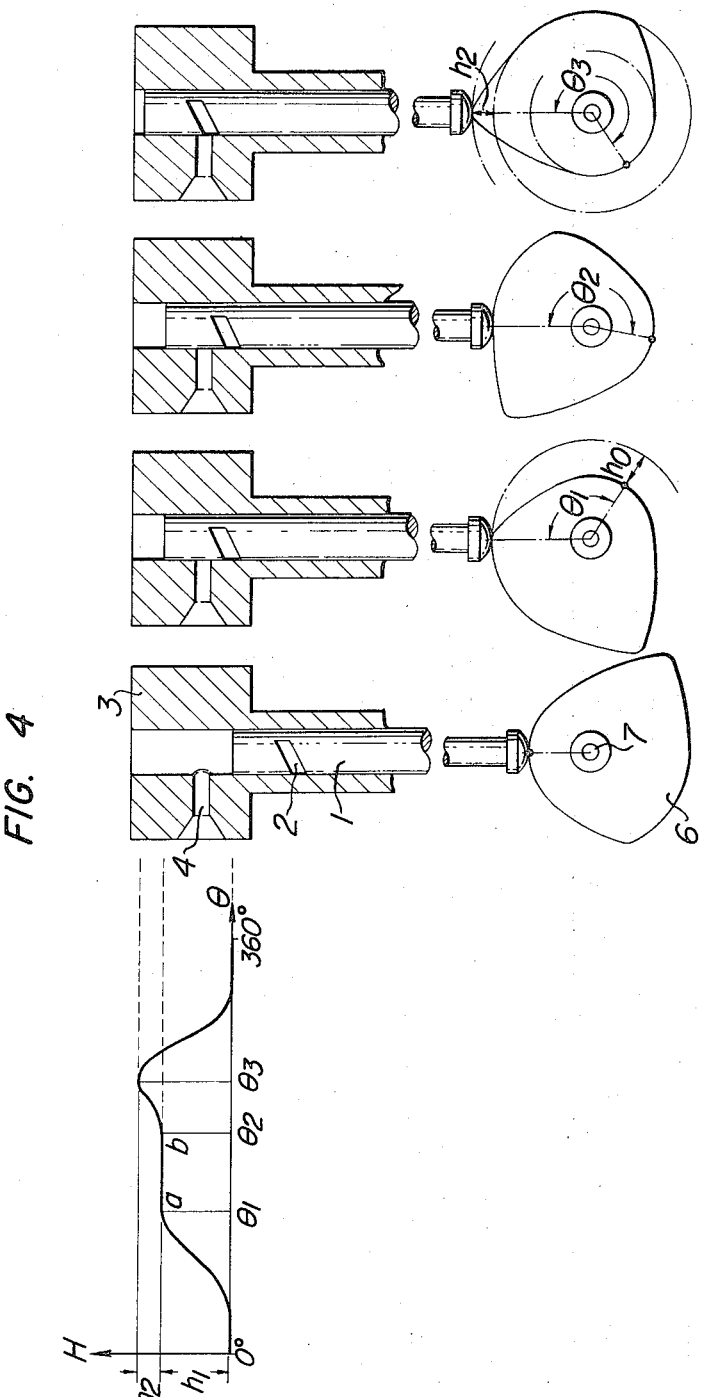
FIG. 4 is a diagram showing sequential positions of a plunger of the fuel injection pump corresponding to lifting positions of the cam made in accordance with the present invention.

Referring now to FIG. 4, a pump plunger driven by a cam made in accordance with the present invention is shown as having two stage stroke (H) comprising a first stage ($h_0$) and a second stage ($h_2$), a region of constant height ($a - b$) being interposed therebetween. The reference ($\theta$) taken in the abscissa represents the angle of rotation of the cam.

Figure 5:
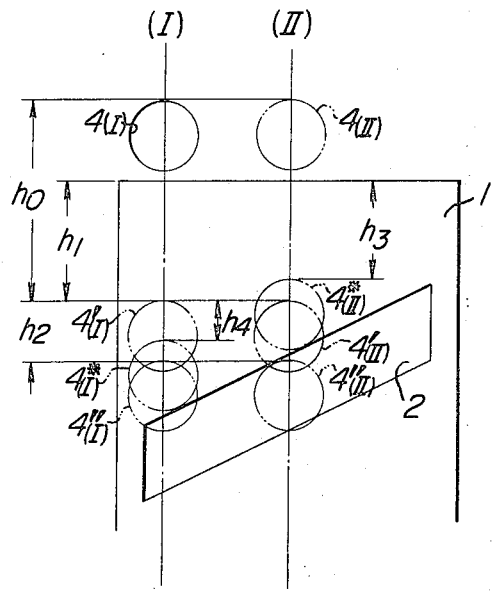
FIG. 5 shows an extended view in an enlarged scale of the relations between the plunger and the intake and output port while the engine in starting operation (I) and in normal running operation (II) respectively; and, FIG. 6 is a diagram showing a fuel injection stroke ($h_3$) for normal engine operation and a fuel injection stroke ($h_1 + h_4$) for engine starting operation in relation with the angle of the cam rotation ($\theta$).

In FIG. 5, the position of the fuel intake and output port (4) before the plunger is lifted is shown by 4(I) during the engine starting (I). When the plunger is lifted by the first stage stroke ($h_0$), the port (4) is positioned as shown by 4*(I) and when it is lifted by the second stage stroke ($h_2$), the port (4) is positioned as shown by 4''(I). As noted in FIG. 5, when the port (4) is positioned at a position 4*(I) between the position 4'(I) and 4''(II), it coincides and therefore begins to communicate with the slanted groove (2) as the plunger moves beyond $h_4$ so that the injection of fuel is then terminated. Since fuel injection is effected while the fuel intake and output port (4) is closed by the plunger during the first stage, the actual injection period is $h_1 + h_4$. During the first period of the first stage stroke ($h_0$), i.e., before the plunger covers port (4), and also during the latter period of the second stage stroke ($h_2$), i.e., after ($h_4$), port (4) communicates with the upper opening in cylinder (3) either directly or via the slanted groove (2), so there is no fuel injection during those periods while the engine is below speed $N_2$ of FIG. 3.

During the normal engine operation (II), the position of the fuel intake and output port (4) before the plunger is lifted is shown by 4(II) while the positions at the first and the second stages are respectively shown by 4'(II) and 4''(II). Therefore, the port (4) coincides and therefore beings to communicate with the rotated slanted groove (2) at the position shown by 4*(II) where the fuel injection is terminated. Thus, the fuel is injected only during the plunger stroke shown by ($h_3$).

Figure 6:
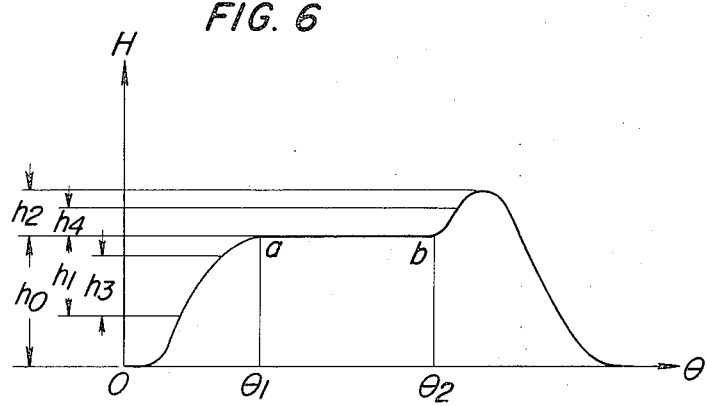

The relationship between the plunger stroke and the fuel injection is shown in FIG. 6.

The operation of the above arrangement will now be described. In FIG. 5, the manner how the longitudinal relative position between the fuel intake and output port (4) and the slanted groove (2) is changed in accordance with the movement of the pump plunger (1) is already shown. During normal engine operation (II), a certain amount of the fuel is injected corresponding to the stroke ($h_3$) which is smaller than the first stage stroke ($h_0$). During the normal operation, the fuel injection terminating slanted groove (2) is rotated by at least the amount corresponding to $S_1$ in FIG. 3 and hence is opened to the fuel intake and output port (4) in the pump cylinder (3) at the first stage stroke of the pump plunger (1), so that the fuel injection is terminated at this point.

During engine starting (I), the pump plunger (1) is rotated by a predetermined angle before its upward stroke is begun. Thus, the main fuel injection is performed during the stroke ($h_1$) which is smaller than the first stage stroke ($h_0$), then the pump plunger is held stationary at a position corresponding to the top dead center of the first stage ($h_0$) of the plunger stroke so that the pressure of the fuel in the pump plunger is maintained at the valve closing pressure of the fuel injection valve, and after the cam is rotated through a predetermined angle of rotation which corresponds to the angle ($\theta$) of the cam between the points ($a$) and ($b$), the auxiliary fuel injection is performed at the second stage ($h_4$) of the cam stroke for the next combustion stroke.

As described above, at the top dead center of the first stage ($h_1$) of the plunger stroke, the pressure of fuel in the fuel conduit between the pump and the fuel injection valve is maintained to a value corresponding to the valve closing pressure of the fuel injection valve, so that the next auxiliary fuel injection can be performed at the second stage ($h_2$) of the plunger stroke by applying only a small additional pressure. Therefore, this makes it possible to decrease the cam slope for the second stage ($h_2$), and thus the auxiliary fuel injection can be performed intermittently and thereby an intimate mixing of fuel and air can be obtained. Further, since the fuel pressure is maintained to the valve closing pressure of the fuel injection valve when the auxiliary fuel injection is performed by the second stage ($h_2$) of the plunger stroke, the auxiliary fuel injection can be performed with a small movement of the plunger. Thus, the second stage ($h_2$) of the plunger stroke can be made small, whereby the first stage ($h_1$) which is also utilized for normal operation can conveniently be made large.

During engine starting, the injection terminating slanted groove (2) is not necessarily opened to the fuel intake and output port (4) at the second stage ($h_2$) of the plunger stroke. For example, the pump plunger may be turned about its longitudinal axis to adjust the stroke of the second stage ($h_2$) to a suitable value by the control rack, so that the auxiliary fuel injection can be performed throughout all of the second stage ($h_2$).

As described above, in accordance with the present invention, a cam is provided for driving a plunger of a fuel injection pump, said cam having two stage lift so that said plunger has two stage stroke, and during engine starting, a main fuel injection is performed at the first stage of the plunger stroke, then the height of the top dead center of the first stage is maintained for a predetermined angle of cam rotation and thereafter an auxiliary fuel injection for the next combustion stroke is performed at the second stage of cam stroke, and during normal engine operation, a fuel injection terminating slanted groove in the pump plunger serves to terminate fuel injection at the first stage of cam stroke only, whereby a required auxiliary fuel injection can be performed only at the time of engine starting without having any effect on the normal engine operation, the auxiliary fuel injection being effective to form a highly combustible mixture of fuel and intake air so that the starting of a diesel engine can be improved. Further, since the height of the top dead center of the first stage plunger stroke is maintained in constant for a predetermined angle of cam rotation at the end of the first stage, the auxiliary fuel injection which is performed at the second stage of plunger stroke can be effected with a small movement of the pump plunger, and by forming a relatively slight cam slope for the second stage, the auxiliary fuel injection can even be made intermittently.

I claim:

1. Apparatus for a vehicle engine fuel injection comprising:
    a fuel injector pump having a pump cylinder with a side fuel port and a pump plunger longitudinally and rotationally movable in said cylinder to open and close said port, and
    means including in the side of said plunger single injection terminating slanting slot communicating internally of said plunger with its fuel compressing end for regulating the time of fuel communication between said end and port in dependence upon both the instant relative height and rotational angle of said port and plunger,
    said means further including means operative on said plunger for causing said slot to be out of communication with said port during engine starting times only for separated periods of time during spaced first and last stages of each movement of said plunger from its lowermost to uppermost positions in said cylinder to provide for fuel injection during those periods but not between them and for causing said slot to be out of communication with said port during normal engine operating times only during a portion of said first stage of movement of said plunger to provide for fuel injection only during said first stage portion during normal engine operation, said means operative on said plunger including means for causing during a first portion of said last stage an auxiliary fuel injection in timed relation with a suction stroke or the beginning part of a compression stroke in each engine combustion cycle while the top dead center that is reached by said plunger at the end of said first stage is maintained between said first and last stages for substantially the whole range of combustion and exhaust strokes in each engine cycle.

2. Fuel injection means for a diesel engine in accordance with claim 1, said injection means further comprising means for rotating said plunger pump about its longitudinal axis by a predetermined angle during change-over from the engine starting to the normal engine operation so that the relative position of said fuel intake and output port and said injection terminating slanted groove can be properly changed in the direction of pump plunger axis.

3. Apparatus as in claim 1 wherein said means operative on said plunger includes plunger rotating and cam lifting means and the latter has a cam surface with first and third portions to effect said first and last stages of movement and an intermediate portion of constant radius to maintain the plunger at the top position caused by the said first portion of the cam surface.

4. Apparatus as in claim 3 wherein said cam first portion surface in conjunction with said rotating means causes said fuel injection period during said first stage to be longer during engine starting times than during engine operating times.

5. Apparatus as in claim 4 wherein the time said slot is out of communication with said port during said last stage movement of the plunger during engine start up times is relatively short compared to either of said first stage fuel injection periods so as to cause a relatively short auxiliary fuel injection period only during engine starting times.

6. Fuel injection for a diesel engine comprising:
    a fuel injection pump having a pump cylinder with an upper injection port and a pump plunger longitudinally slidable in said pump cylinder between said port and a lower position,
    rotatable cam means for longitudinally lifting said pump plunger in said pump cylinder from said lower position,
    said cam means including a cam surface having a first portion for producing a first stage of plunger lift to provide a first period for main fuel injection, a second portion spaced from said first portion for producing a second stage of plunger lift to provide during a later time a second period for auxiliary fuel injection, and a third portion for producing during a third intervening period a third stage of plunger lift constantly at the height of the top dead center of said first stage of plunger lift for a predetermined angle of cam means rotation between said two stages,
    said auxiliary fuel injection being effected in timed relation with the suction stroke or the beginning part of the compression stroke in each engine combustion cycle and said top dead center of said first stage, that is operative preceding said auxiliary fuel injection, being maintained in substantially the whole range of combustion and exhaust strokes in each engine cycle, said pump cylinder being provided with with a fuel intake and output port disposed between said injection port and lower plunger position, said pump plunger being provided at its surface with an injection terminating slanted groove arranged to be communicatable with said fuel intake and output port during part of the longitudinal movement of said plunger, and having a longitudinal bore communicated with said slanted groove for opening to the end of said plunger, and control means for rotationally driving said pump plunger in said pump cylinder according to engine operation to cause A. at engine starting times, said ports to be in communication with each other directly for a first portion of said first stage and indirectly through said slanted groove and bore during a second portion of said second stage to prevent fuel injection during said portions and to be out of communication with each other during a second portion of said first stage so as to effect said main fuel injection period and also to be out of communication during a first portion of said second stage so as to effect said auxiliary fuel injection period, and B. to cause during normal engine operation, said ports to be in communication with each other during all three of said stages except for a main fuel injection period during said first stage.

* * * * *